UNITED STATES PATENT OFFICE.

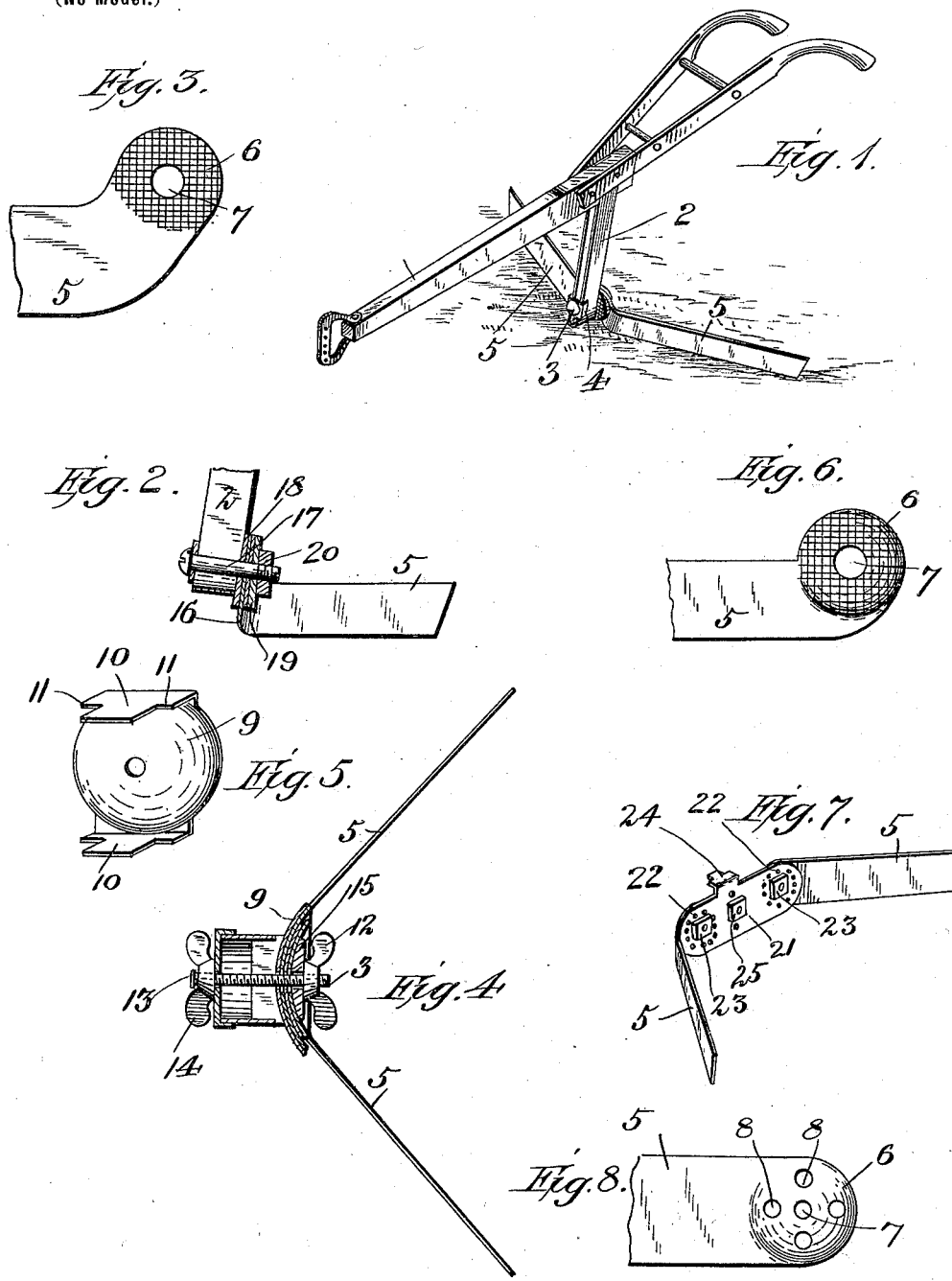

CHARLES ARCHIBALD THURMOND, OF PERRY, GEORGIA.

COTTON-CULTIVATOR.

SPECIFICATION forming part of Letters Patent No. 644,812, dated March 6, 1900.

Application filed October 26, 1899. Serial No. 734,843. (No model.)

*To all whom it may concern:*

Be it known that I, CHARLES ARCHIBALD THURMOND, a citizen of the United States, residing at Perry, in the county of Houston and State of Georgia, have invented certain new and useful Improvements in Cotton-Cultivators; and I do hereby declare the following to be a full, clear, and exact description of the invention, such as will enable others skilled in the art to which it appertains to make and use the same.

My invention relates to cultivators, and more particularly to what is commonly called a "cotton-scraper," designed to cultivate the cotton-plant during the different stages of its growth.

The object of my invention is to provide means for readily adjusting or converting the scraper-blades so that they will be in the desired position for cultivating the soil between the rows of growing plants both while the surface of the soil is in a comparatively-level condition and after the soil has been thrown upward in rows or ridges, which is commonly done during the last stages of the growth of the plant. My scraper can be attached to any kind of a plow shank or stock. It will be understood that it will be necessary to provide means for permitting an adjustment of the blades and also for securely locking them in the desired position without the necessity of spending but little time in the operation of changing the cultivator from one position to another. This ready adjustment of the cultivator-blades is made by the simple means which I will hereinafter fully describe, and illustrate in the accompanying drawings, in which—

Figure 1 is a perspective view of my invention complete ready for use. Fig. 2 is a vertical central section of the plow-shank and the inner ends of the blades after they are secured together by one of the means provided by me. Fig. 3 is a detail view showing one end of one of the cultivator-blades. Fig. 4 is a top plan view of the cultivator-blades, showing a central section of the device employed to hold the inner ends thereof in coöperative relationship with each other. Fig. 5 is perspective detail view of the anchoring-plate employed by me to hold the blades in an adjusted position. Fig. 6 is a perspective view showing a different form of construction for the inner ends of the blades from that illustrated in Fig. 5. Fig 7 is a perspective detail view showing a varied form of anchoring-plate designed to coöperate with the inner ends of the cultivator-blades. Fig. 8 is a perspective view showing another form of cultivator-blade and also illustrating a varied means for adjusting the same in the desired position.

In order to conveniently designate the several parts of my invention and their coöperating features, figures will be employed, of which 1 and 2 indicate, respectively, the beam and shank of a plow, which may be of any preferred construction, though in this instance I have shown said shank to be constructed of a single piece of heavy sheet metal bent upon itself near its middle, the upper free ends being attached to the rear end of the beam of the plow in any preferred way, as by bolts. It will be understood that in lieu of this form of shank one of wood may be substituted having a central vertically-disposed slot to provide an adjustment for the clamping-bolt 3. If a metallic shank of the character illustrated in Fig. 1 is employed, a suitable clip 4 may be provided for the front side of said shank through which the anchoring-bolt 4 is extended into coöperation with the inner ends of the cultivator-blades 5, it being understood that the inner ends 6 of said blades, as illustrated in Figs. 3, 6, and 8, may be provided with a single central aperture, as 7, or with a plurality of said apertures, as indicated by 8 in Fig. 8, the purpose of which will be hereinafter specifically set forth. Designed to coöperate with the said inner ends of the cultivator-blades 5 is the anchoring-plate illustrated in Fig. 5 and consisting of the central cup-shaped portion 9, having the integral anchoring-ears 10, each of said ears having the laterally-extending shoulders 11, which are designed to bear directly against the rear edges of the shank 2, while the ears reach in the opening between the members of said shank, thereby holding said plate against rotation, which is absolutely essential, inasmuch as said plate is designed to hold the cultivator-blades 5 in an adjusted position.

In Fig. 4 it will be observed that the outer or exposed side of the anchoring-plate 9 is concave, and designed to fit within this concavity are the prepared cup-shaped ends 6 of the cultivator-blades, the one fitting directly upon the other, each being provided with a central aperture 7 or a series of apertures 8, designed to receive the clamping-bolt 3, which is securely locked in position preferably by the thumb-screw 12, it being understood that a simple head, as 13, or an additional thumb-screw 14 may be provided in the forward end, in which case both ends of said bolt will be threaded, or said bolt may be threaded throughout from end to end, thus insuring that the securing ends may be turned in opposite directions or worked against each other in order to produce the best results.

A suitable washer, as 15, having an inner convex face, is designed to fit loosely over the bolt 3 and against the concaved face of the outer head 6 in order that the securing-nut 12 may effectively perform its office of locking the parts in an adjusted position.

I prefer to corrugate or otherwise roughen the contacting surfaces of the anchoring-plate 9 and the inner ends 6 of the cultivator-blades in order that a tighter union may be more readily set up at the expense of a minimum amount of friction induced by the securing-nut, as will be readily understood.

In Fig. 2 I have illustrated a cultivator-blade having its inner end 16 bent substantially at right angles to the body portion and provided with an aperture designed to receive the anchoring-bolt 17, and in order to provide that the blades may be readily adjusted at varying angles with respect to the beam of the plow I provide the washers 18 and 19, which, as will be seen by said view, are wedge shape, it being readily understood that by a proper adjustment of said washers the inclination of the blades with respect to each other may be readily controlled, as by rotating the washers to the proper extent, the parts being securely held in an adjusted position by the locking-nut 20.

In Fig. 7 I have shown another construction which may be adopted in forming the anchoring-plate shown in Fig. 5, consisting of the body portion 21, having the cup-shaped ends 22, which are convex upon their forward side and designed to receive the concaved side of the ends 6, the parts being locked in their adjusted position by a suitable bolt and the nut 23 coöperating therewith. The central portion of the plate 21 is provided upon its lower and upper edges with the inwardly-directed anchoring-stems 24, designed to extend between the sides of the shank 2, and thereby hold the plate in a horizontal position, as by a bolt passing through said shank and having the locking-nut 25 coöperating therewith. Each of the ends of the plate 21 is provided with a plurality of apertures designed to coöperate with the apertures 8, provided in the blades 5, and it is obvious that by placing the locking-bolt in different ones of these apertures a separate and distinct adjustment will be the result.

It will be obvious by reference to Fig. 1 that the anchoring-bolt 3 may be disposed at different heights upon the shank 2, thus imparting a further adjustment to the position of the blades, though it is thought that best results will follow when said bolt is disposed near the lower end of said shank.

During the early stages of the cultivation of the cotton or other growing plants the surface of the soil is in a practically-level condition; but as the maturity of the plant progresses it is desirable to throw the soil toward the growing plant, thereby forming ridges, of which the plant forms the center. It therefore follows that as these ridges grow in extent a further adjustment must be given to the cultivator-blades in order to contact with the surface thereof or in order to keep the cutting edges of the blades substantially parallel with the inclined surface of said ridges, and it is therefore necessary to provide means for adjusting the blades so that they will occupy varying angles of inclination both with respect to their rearward extension as well as with respect to the inclined sides of said ridges.

By the construction I have just described and illustrated it is obvious that all that will be necessary to change the angle of the cultivator-blades to the desired position will be to unloosen the thumb-nut and raise or lower the free ends of said blades to the desired point and again securing said nut. Since the contacting surfaces of the anchoring-plate 9 and the blades are provided with a series of corrugations or grooves, it requires but little power as applied through the thumb-nut to hold them locked together.

The centrally-disposed aperture 7 should be of larger size than the anchoring-bolt 3, the object being to permit the cup-shaped ends to play around the bolt and thereby enable them to find their proper seat within the concaved side of the anchoring-plate 9, which would not be possible if said aperture were of the same size as said bolt, inasmuch as no longitudinal movement of the blades would be possible.

In Fig. 8 I have shown the cultivator-blades proper as extending directly from the cup-shaped ends 6, while in Figs. 3 and 6 I have illustrated said blades as extending from the lower side of said anchoring end, it being understood that both forms of construction have their advantages under certain conditions.

While I have illustrated the preferred construction to be adopted in producing the various details of my improved cotton-cultivator, it will be understood that I desire to comprehend the substantial equivalent thereof, and I do not wish to be confined strictly to the exact showing herein made.

Believing that the advantages and operation of my invention have been made fully apparent from the foregoing specification, considered in connection with the accompanying drawings, further reference to the details thereof will be dispensed with.

Having thus fully described my invention, what I claim as new, and desire to secure by Letters Patent, is—

1. The herein-described cultivator for cotton or the like, comprising a suitable beam and shank; an anchoring-plate having a concaved outer face and anchoring-stems; suitable means to attach said plate to said shank, in combination with cultivator-blades having inner cup-shaped ends adapted to fit said plate and means to hold said parts in an adjusted position in the manner specified and for the purpose set forth.

2. The herein-described cultivator for growing cotton-plants or the like, comprising a suitable beam and shank therefor; an anchoring-plate secured to said shank; cultivator-blades having inner cup-shaped ends and means to adjustably attach said cup-shaped ends to said anchoring-plate, whereby said blades may be disposed in varying angles of inclination in the manner specified and for the purpose set forth.

3. The herein-described cultivator for cotton-plants or the like, comprising a suitable beam and shank therefor, the latter having a vertically-disposed slot; an anchoring-bolt passing through said slot; a cup-shaped anchoring-plate in combination with cultivator-blades having cup-shaped ends fitting said plate and means to hold said parts together as specified and for the purpose set forth.

In testimony whereof I affix my signature in presence of two witnesses.

CHARLES ARCHIBALD THURMOND.

Witnesses:
JNO. H. HODGES,
J. H. HOUSER.